United States Patent
Yamamoto et al.

(10) Patent No.: US 9,747,132 B2
(45) Date of Patent: Aug. 29, 2017

(54) MULTI-CORE PROCESSOR USING FORMER-STAGE PIPELINE PORTIONS AND LATTER-STAGE PIPELINE PORTIONS ASSIGNED BASED ON DECODE RESULTS IN FORMER-STAGE PIPELINE PORTIONS

(71) Applicant: DENSO CORPORATION, Kariya, Aichi-pref. (JP)

(72) Inventors: Hirofumi Yamamoto, Obu (JP);
Takeshi Kondo, Nagoya (JP);
Shinichirou Taguchi, Nagoya (JP);
Takatoshi Nomura, Kariya (JP);
Daihan Wang, Okazaki (JP);
Tomoyoshi Funazaki, Kariya (JP);
Yukoh Matsumoto, Tsukuba (JP)

(73) Assignee: DENSO CORPORATION, Kariya (JP)

(*) Notice: Subject to any disclaimer, the term of this patent is extended or adjusted under 35 U.S.C. 154(b) by 337 days.

(21) Appl. No.: 14/244,994

(22) Filed: Apr. 4, 2014

(65) Prior Publication Data

US 2014/0317380 A1    Oct. 23, 2014

(30) Foreign Application Priority Data

Apr. 18, 2013 (JP) .................. 2013-87372

(51) Int. Cl.
*G06F 9/48* (2006.01)
*G06F 9/38* (2006.01)
*G06F 9/50* (2006.01)

(52) U.S. Cl.
CPC .......... *G06F 9/4881* (2013.01); *G06F 9/3867* (2013.01); *G06F 9/5011* (2013.01); *G06F 9/505* (2013.01); *G06F 2209/507* (2013.01)

(58) Field of Classification Search
None
See application file for complete search history.

(56) References Cited

U.S. PATENT DOCUMENTS

| 6,105,127 A | 8/2000 | Kimura et al. |
| 2003/0081615 A1 | 5/2003 | Kohn et al. |

(Continued)

FOREIGN PATENT DOCUMENTS

| JP | H10-124316 A | 5/1998 |
| JP | 11-024930 A | 1/1999 |

(Continued)

OTHER PUBLICATIONS

Hiroaki Hirata et al., "Performance Comparisons of Instruction Cache Configurations and Instruction Fetch Schemes for a Multithreaded Processor or a 1-Chip Multiprocessor", The transactions of the Institute of Electronics, Information and Communication Engineers vol. J81-D-1 No. 6, pp. 718-727, Jun. 25, 1998, Japan.

(Continued)

*Primary Examiner* — John Lindlof
(74) *Attorney, Agent, or Firm* — Posz Law Group, PLC

(57) ABSTRACT

A multi-core processor includes a plurality of former-stage cores that perform parallel processing using a plurality of pipelines covering a plurality of stages. In the pipelines, the former-stage cores perform stages ending with an instruction decode stage; stages starting with an instruction execution stage are executed by a latter-stage core. A dynamic load distribution block refers to decode results in the instruction decode stage and controls to assign the latter-stage core with a latter-stage-needed decode result being a decode result whose processing needs to be executed in the latter-stage core.

18 Claims, 7 Drawing Sheets

(56) References Cited

U.S. PATENT DOCUMENTS

| | | |
|---|---|---|
| 2003/0084309 A1 | 5/2003 | Kohn |
| 2003/0088610 A1 | 5/2003 | Kohn et al. |
| 2003/0093614 A1 | 5/2003 | Kohn et al. |
| 2003/0097518 A1 | 5/2003 | Kohn et al. |
| 2003/0105907 A1 | 6/2003 | Kohn et al. |
| 2004/0172631 A1* | 9/2004 | Howard .............. G06F 9/30087 718/100 |
| 2004/0193854 A1 | 9/2004 | Cho |
| 2005/0240930 A1 | 10/2005 | Amamiya et al. |
| 2009/0210660 A1 | 8/2009 | Webber |
| 2010/0031006 A1 | 2/2010 | El-essawy et al. |
| 2011/0055838 A1* | 3/2011 | Moyes .................. G06F 9/4881 718/102 |
| 2012/0060017 A1 | 3/2012 | Morishita |
| 2014/0344818 A1 | 11/2014 | Funazaki et al. |

FOREIGN PATENT DOCUMENTS

| | | |
|---|---|---|
| JP | 2004-227587 A | 8/2004 |
| JP | 2011-511378 A | 4/2011 |
| JP | 2014-225137 A | 12/2014 |
| WO | 03/036902 A2 | 5/2003 |
| WO | 2010/134329 A1 | 11/2010 |

OTHER PUBLICATIONS

Office Action mailed on Apr. 21, 2015 in the corresponding JP application No. 2013-087372 (and English translation).

Office Action mailed Apr. 21, 2015 in corresponding JP application No. 2013-087372 (English translation included).

Hirata et al., An Element Processor Architecture with Parallel Instruction Issuing from Multiple Threads, Magazine of The Information Processing Society, Apr. 15, 1993, 595-605, vol. 34 No. 4, Information Processing Society of Japan, Japan. Partial English translation included.

* cited by examiner

FIG. 4

| TASK NO. | STATE | DEADLINE T | WORST T | REMAIN T | Q NO. |
|---|---|---|---|---|---|
| 1 | INTERRUPT | 100 | 20 | 20 | Don't care |
| 2 | STOP | 1000 | 20 | Don't care | Don't care |
| 3 | ASSIGNED | 200 | 10 | 10 | 1 |
| 4 | ASSIGNED | 150 | 20 | 10 | 2 |
| ... | ... | ... | ... | ... | ... |
| N | INTERRUPT | 150 | 50 | 10 | Don't care |

FIG. 5A CORE (1)

| | 1 | 2 | 3 | 4 | 5 | 6 | 7 | 8 | 9 | 10 | 11 | 12 |
|---|---|---|---|---|---|---|---|---|---|---|---|---|
| IF | ADD | ADD | B | | LDR | LDRB | LDRH | | | | | |
| ID | | ADD | ADD | B | | LDR | LDRB | LDRH | | | | |
| EX | | | ADD | ADD | | | LDR | LDRB | LDRH | | | |
| MA | | | | | | | | LDR | LDRB | LDRH | | |
| WB | | | | | | | | | LDR | LDRB | LDRH | |

```
ADD  R0 R2
ADD  R0 R3
B    #FN_1

FN_1:
LDR   R3[R0]
LDRB  R4[R3]
LDRH  R5[R3, #4]
```

FIG. 5B CORE (2)

| | 1 | 2 | 3 | 4 | 5 | 6 | 7 | 8 | 9 | 10 | 11 | 12 |
|---|---|---|---|---|---|---|---|---|---|---|---|---|
| IF | B | | LDR | LDRB | LDRH | B | | | | | | |
| ID | | B | | LDR | LDRB | LDRH | B | | | | | |
| EX | | | | | LDR | LDRB | LDRH | B | | | | |
| MA | | | | | | LDR | LDRB | LDRH | | | | |
| WB | | | | | | | LDR | LDRB | LDRH | | | |

```
B    #FN_2

FN_2:
LDR   R3[R0]
LDRB  R4[R0, #4]
LDRH  R5[R4, R3]
B    #FN_3
```

FIG. 5C FORMER 2 CORES + LATTER 1 CORE

| | | 1 | 2 | 3 | 4 | 5 | 6 | 7 | 8 | 9 | 10 | 11 | 12 |
|---|---|---|---|---|---|---|---|---|---|---|---|---|---|
| IF | 1 | ADD | ADD | B | | LDR | LDRB | LDRH | | | | | |
| | 2 | B | | LDR | LDRB | LDRH | B | | | | | | |
| ID | 1 | | ADD | ADD | B | | LDR | LDRB | LDRH | | | | |
| | 2 | | B | | LDR | LDRB | LDRH | B | | | | | |
| EX | | | | ADD | ADD | LDR | LDRB | LDR | LDRB | LDRH | LDRB | LDRH | |
| MA | | | | | | LDR | LDRB | LDRH | LDR | LDRB | LDRH | LDRB | LDRH |
| WB | | | | | | | LDR | LDRB | LDRH | LDR | LDRB | LDRH | LDRB |

MULTI-CORE PROCESSOR USING FORMER-STAGE PIPELINE PORTIONS AND LATTER-STAGE PIPELINE PORTIONS ASSIGNED BASED ON DECODE RESULTS IN FORMER-STAGE PIPELINE PORTIONS

CROSS REFERENCE TO RELATED APPLICATION

The present application is based on Japanese Patent Application No. 2013-87372 filed on Apr. 18, 2013, the disclosure of which is incorporated herein by reference.

TECHNICAL FIELD

The present disclosure relates to a multi-core processor that is a microprocessor to adopt a multi core configuration.

BACKGROUND ART

[Patent Literature 1] JP-2005-507212 A (WO 03/036902 A2)
[Patent Literature 2] JP 2005284749 A (US 2005/0240930 A1)

A microprocessor adopting a multi core configuration performs parallel processing of multiple tasks. In order to raise a processing efficiency, it is necessary to schedule the processing order so as to satisfy restrictions (so-called deadline) of the processing time specified to each task. The processing efficiency is decided by how to optimize such scheduling.

For example, Patent Literature 1 discloses a method to realize an efficient task assignment or distribution by using hash values when processing tasks belonging to multiple groups with a multi-core processor. Patent Literature 2 discloses a computer that defines previously an execution sequence of threads and classifies into a grain size that can be exclusively executed, thereby achieving an efficient parallel processing.

Each technology of Patent Literatures 1 and 2 increases an efficiency of assignment of tasks (threads) to each processor core. A task assigned to each processor core is processed sequentially in processing stages corresponding to each core (pipeline processing). However, all the instructions are not performed in all the processing stages. Part of the processing stages may be not performed depending on a kind of instruction. For example, Memory Access (MA) stage is not performed by an inter-register calculation instruction. When this point is taken into consideration, the stages of pipeline processing may have room to raise a processing efficiency.

SUMMARY

It is an object of the present disclosure to provide a mufti-core processor that can raise a processing efficiency by improving efficiency in pipeline processing.

To achieve the above object, according to an example of the present disclosure, a multi-core processor includes a plurality of processor cores and a load distribution processing portion. The plurality of processor cores are to perform parallel processing of a plurality of tasks using a plurality of pipelines each containing a plurality of stages. The pipeline is divided into a former-stage pipeline portion ending with an instruction decode stage, and a latter-stage pipeline portion starting with an instruction execution stage. The load distribution processing portion is to refer to decode results in the instruction decode stage and control to assign the latter-stage pipeline portion with a latter-stage-needed decode result among the decode results, the latter-stage-needed decode result being a decode result whose processing needs to be executed in the latter-stage pipeline portion.

Here, some instructions decoded in the former-stage pipeline portion may not include processing that needs to be performed in the latter-stage pipeline portion. In such a case, the corresponding latter-stage pipeline portion can perform another different instruction. This can provide effective processing.

Further, according to an optional example of the above multi-core processor multi-core processor, when a plurality of instructions decoded in the former-stage pipeline portion are ready to undergo parallel execution, the load distribution processing portion may assign the plurality of instructions to a plurality of latter-stage pipelines and permit the plurality of latter-stage pipelines to perform the parallel execution of the plurality of instructions.

This configuration enables a quick performance of a plurality of instructions to improve a processing efficiency.

BRIEF DESCRIPTION OF THE DRAWINGS

The above and other objects, features, and advantages of the present disclosure will became more apparent from the following detailed description made with reference to the accompanying drawings. In the drawings:

FIG. 4 is a diagram illustrating an example of a task information table;

FIGS. 5A to 5C are diagrams for explaining an example of using one latter-stage pipeline portion that performs instructions decoded by two former-stage cores;

DETAILED DESCRIPTION (First Embodiment)

Figure 1:
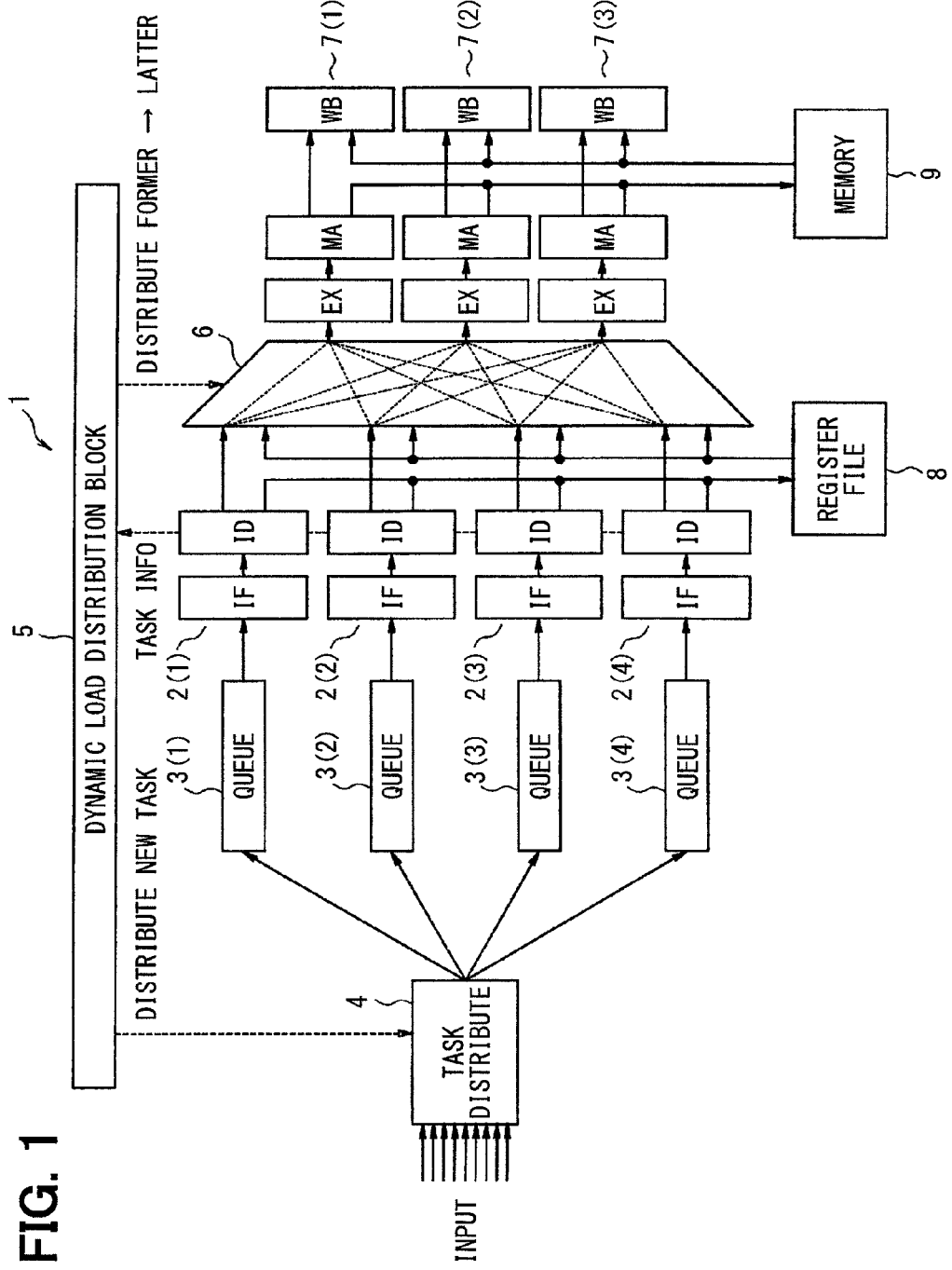
FIG. 1 is a functional block diagram illustrating a configuration of a multi-core processor according to a first embodiment of the present disclosure.

With reference to FIG. 1, a multi-core processor 1 according to a first embodiment of the present disclosure includes four former-stage cores 2(1) to 2(4), which configure a former-stage portion of a pipeline (former-stage pipeline portion) for performing or executing parallel processing. The former-stage cores 2(1) to 2(4) are provided with corresponding task queues 3(1) to 3(4). A task distribution block 4 distributes tasks into among the respective task queues 3(1) to 3(4); the tasks are arranged one by one in waiting state to wait for being processed in the respective former-stage cores 2(1) to 2(4). Each former-stage core 2(1) to 2(4) serving as a former-stage pipeline portion executes (i.e., perform) an instruction fetch (IF) stage and an instruction decode (ID) stage.

Distribution control in the task distribution block 4 (new task distribution queue) is performed by a dynamic load distribution block 5 (also referred to as a load distribution processing portion). The dynamic load distribution block 5 distributes a new task to one of the task queues 3(1) to 3(4)

depending on decode results in the ID stage (details will be mentioned later). That is, the pipeline has a configuration having a relation as follows:

(the number of former-stage cores)>(the number of latter-stage cores).

Instructions decoded at the ID stages of the former-stage cores 2(1) to 2(4) are distributed, for execution, into the latter-stage cores 7(1) to 7(3), which configure a latter-stage pipeline portion via a latter-stage process distribution portion 6. In addition, a register file 8 is provided in between the ID stages and the latter-stage process distribution portion 6; the register file 8 is to be accessed by each former-stage core 2.

The dynamic load distribution block 5 also performs a distribution control of the latter-stage process distribution portion 6. The latter-stage core 7 performs an instruction execution (EX) stage, a Memory Access (MA) stage, and a write back (WB) stage. A memory 9 is provided in between the MA stage and the WB stage. In addition, the WB stage performs writing to the register file 8 while the EX stage similarly performs writing; however, those paths are omitted in the drawing.

Figure 2:
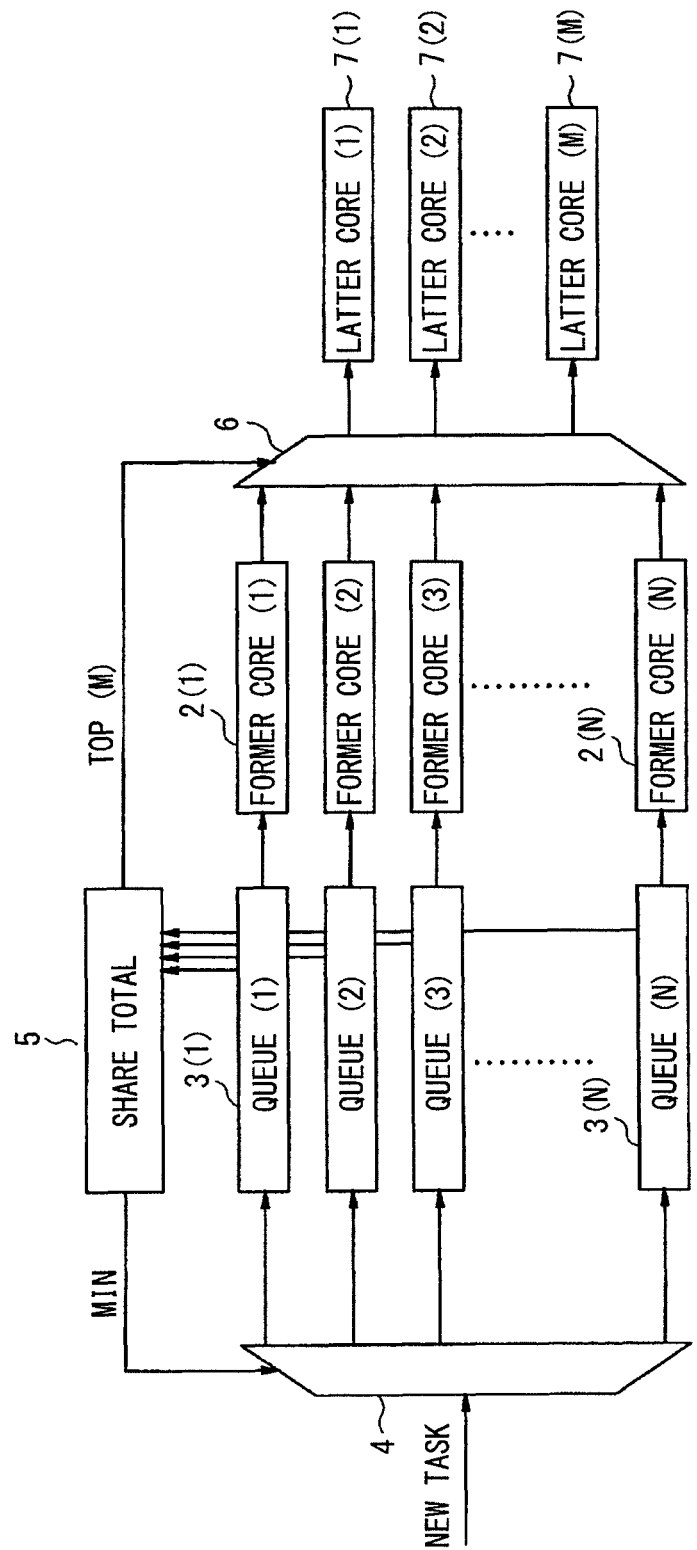
FIG. 2 is a diagram for explaining processing of a dynamic load distribution block.

With reference to FIG. 2, the dynamic load distribution block 5 totals the shares (i.e., obtains a share total) of the tasks which exist in each task queue 3 in the waiting state. It is noted that the "share" is obtained about each task in the queue 3, and is a ratio of a remaining execution time to a deadline time (processing limit time). The deadline time is decided depending on an application; In order to execute processing of the application not to cause trouble, the execution completion of the task needs to be made within the deadline time. The dynamic load distribution block 5 controls the task distribution block 4 indicated as a symbol of a de-multiplexer so as to distribute a new task into the task queue 3 that has the minimum or lowest share total that totals the shares at this time point.

Further, the dynamic load distribution block 5 controls the latter-stage process distribution portion 6 so as to distribute preferentially the processing of the former-stage core 2 corresponding to the task queue 3 providing the maximum or highest share total that totals the shares to the latter-stage core (EX stage to WB stage). It is noted that FIG. 2 indicates, in general, that the number of former-stage cores is N and the number of latter-stage cores is M (<N).

Figure 3:
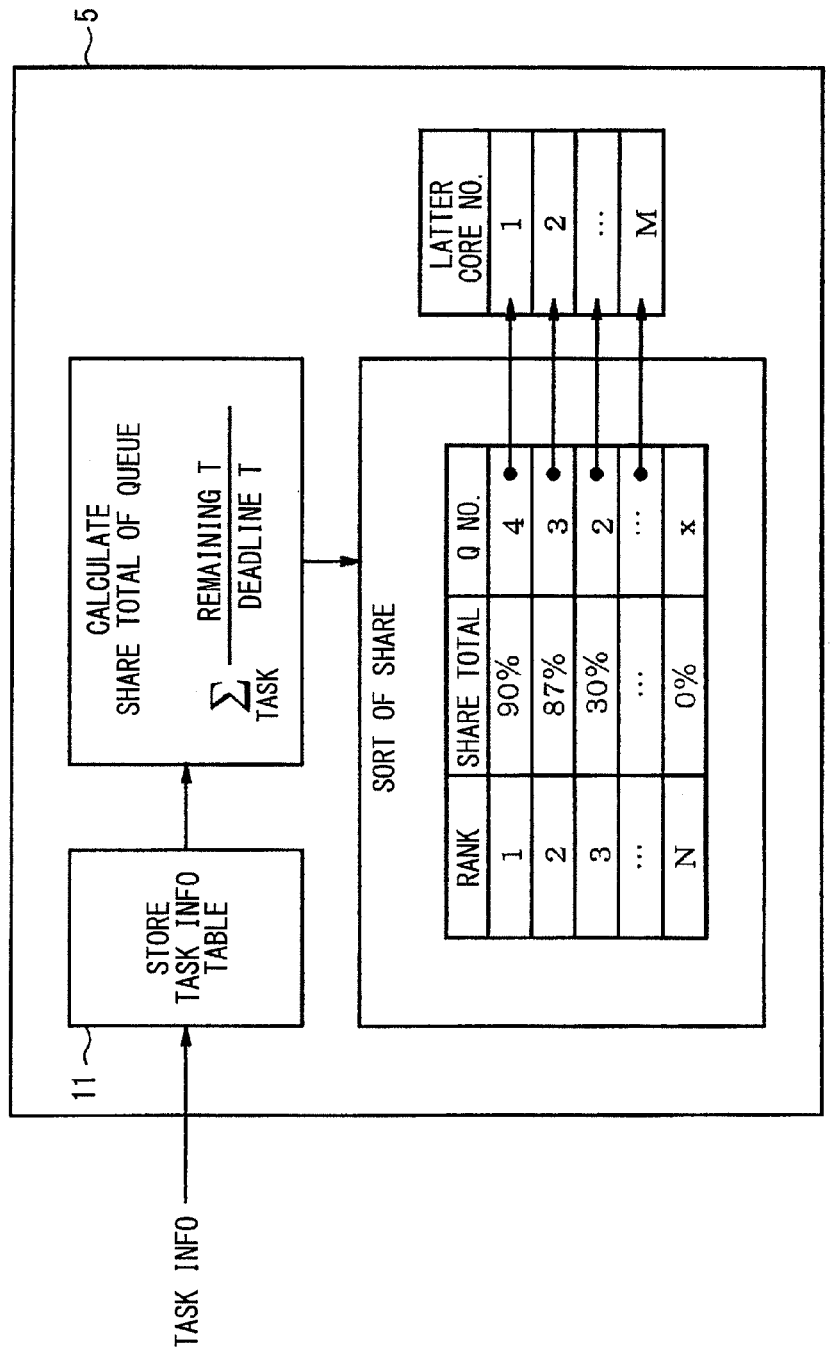
FIG. 3 is a functional block diagram of the dynamic load distribution block.

With reference to FIG. 3, the dynamic load distribution block 5 calculates the total of shares (the share total) for each of task queues 3 based on a task information table in a task information storage 11 indicated in FIG. 4, and sorts the share totals of the respective task queues 3 to be assigned with orders or ranks from the highest share total. FIG. 3 illustrates an example where the queue number 4 is sorted at the 1st rank with the share total of 90%, the queue number 3 is sorted at the 2nd rank with the share total of 87%, the queue number 2 is sorted at the 3rd rank with the share total of 30% . . . To that end, the queue number x, which is sorted at the last rank with the lowest or minimum share total, is assigned with a next new task. Herein, the task queue 3 having the queue number x sorted at the last rank or rank may be referred to as a minimum-shared task queue 3. In addition, the tasks, which are sorted at the first rank (top rank) to the Mth rank, are assigned to the latter-stage cores.

With reference to FIG. 4, the task information table in the storage 11 stores the dynamic execution states of the respective tasks that are classified among "stop (state)" that is a state where execution of a task is stopped; "assigned (state)" that is a state where a task is already assigned or distributed to a task queue 3; and "interrupted (state)" that is a state where execution of a task is interrupted. The task information table in the storage 11 further stores the static processing time information containing the above-mentioned deadline time and remaining execution time, and a worst execution time. Here, the worst execution time signifies a time necessary for completing all the processing of a task when only the processing of the task is executed. In addition, the task information table in the storage 11 further stores, if a task is already assigned, the queue number of a queue to which the task is assigned. In addition, "don't care" is a state where the assignment or distribution of a task to a task queue 3 is unnecessary (dynamic execution state).

In addition, the distribution control to the latter-stage core 7 by the dynamic load distribution block 5 is not limited to the example in FIG. 2. Some instructions do not use the latter-stage core 7 depending on the decode results at the ID stage; this may need to consider a different distribution. Furthermore, some instructions performed by more than one former-stage core 7 can be performed in parallel; this may also need to consider a different distribution. Such distribution will be explained in its operation as below.

FIGS. 5A and 5B each illustrate a comparative example where each of two independent cores performs instructions with an individual independent pipeline. FIG. 5C illustrates an example where the above instructions in FIGS. 5A and 5B are performed with the multi-core processor 1 according to the present embodiment. For example, the core (1) in FIG. 5A performs respective add instructions ADD in the third and the fourth cycles; in contrast, the instructions ADD need not perform a MA stage or another stage subsequent to the MA stage.

In addition, after a branch instruction B is fetched in the third cycle, the branch is executed and a next load instruction LDR is then fetched. Then, an instruction "LDR R3[R0]" loads data from an address indicated by the content in a register R0 into a register R3 in a register file 8. A next instruction "LDRB R4[R3]" loads data from an address indicated by the content in the register R3 into a register R4. The decode of the load instruction LDRB is performed in the 7th cycle, while the execution of the load instruction LDRB is performed not from the 8th cycle but from the 9th cycle where the WB stage (register transfer) related to the load instruction LDR is performed. As a result, a vacancy occurs in the pipeline that starts performing an execution from the 8th cycle.

In addition, in the core (2) illustrated in FIG. 5B, the execution of the instruction LDR starts from the 5th cycle; the execution of the instruction LDRB starts from the 6th cycle; and the execution of the instruction LDRH starts from the 8th cycle. That is, in order to start the execution "LDRB R4[R8, #4]", it is not necessary to wait for the execution completion of the instruction "LDR R3 [R0]".

Then, in the core (2) in FIG. 5A, the execution of the instruction LDR starts from the 7th cycle; the execution of the instruction LDRB starts from the 9th cycle; and the execution of the instruction LDRH starts from the 10th cycle. Therefore, the processing of the latter-stage pipeline portions of the two cores (1) and (2) can be performed even if they are put into a single pipeline. As a result, as indicated in FIG. 5C, the dynamic load distribution block 5 performs the distribution or assignment such that the processing of the latter-stage pipeline portions of the two cores (1) and (2) are integrated into one latter-stage pipeline portion of one pipeline.

According to the present embodiment, the multi-core processor 1 includes a plurality of former-stage cores (2) that perform parallel processing using a plurality of pipelines. The former-stage cores 2 perform or execute the stages of the pipeline ending with an instruction decode stage; the latter-stage core 7 performs or executes the stages of the pipeline starting with an instruction execution stage. Further, the dynamic load distribution block 5 refers to decode results in the instruction decode stage and controls to distribute a latter-stage-needed decode result of the former-stage cores 2 to the latter-stage core 7; the latter-stage-needed decode result signifies a decode result that needs to be executed in the latter-stage core 7 among the decode results of the instruction decode stage. Thus, if an instruction decoded at the former-stage pipeline portion does not need to be executed at the latter-stage pipeline portion, the corresponding latter-stage core 7 can execute another different instruction. This can provide the effective processing.

Further, when a plurality of instructions decoded in the former-stage cores 2 are ready to undergo parallel execution, the dynamic load distribution block 5 distributes such the instructions to a plurality of latter-stage cores 7 to undergo the parallel execution. This configuration enables a quick execution of the processing of a plurality of instructions to improve the processing efficiency.

Further, the present embodiment provides a plurality of task queues 3 having one-to-one correspondence to a plurality of former-stage cores 2, each of the plurality of task queues 3 permitting each of the plurality of former-stage cores 2 to execute the tasks one by one; and a task information table in the storage 11 that holds static processing time information about a plurality of tasks and reflects dynamic execution states about the plurality of tasks. In addition, the dynamic load distribution block 5 refers to the task information table in the storage 11 and performs distribution processing of a new task to each of the plurality of task queues 3. That is, the static processing time information is necessary for completing the execution of each task, while the dynamic execution state indicates the execution state of each task at each time. Therefore, the dynamic load distribution block 5 can distribute a new task efficiently based on the information.

To be specific, the dynamic load distribution block 5 calculates, about each task queue 3, a share of each task of the plurality of tasks presently in waiting state using a ratio of a remaining execution time to a processing limit time, and obtains a total of shares (i.e., a share total) that totals the shares of the plurality of tasks in each task queue 3; and finds a minimum-shared task queue 3 that is the task queue 3 providing the lowest share total among the share totals of the plurality of task queues 3, and assigns the found minimum-shared task queue 3 with a next new task. This enables the distribution to equalize the share totals of the respective task queues 3.

In addition, the dynamic load distribution block 5 gives a priority to a high-shared former-stage core 2 that is the former-stage core 2 corresponding to a high-shared task queue 3, which is the task queue 3 providing a higher share total among the share totals of the plurality of task queues 3, to thereby distribute the decode result of the high-shared former-stage core 2 to the latter-stage core 7. This facilitates the processing of the high-shared task queue 3 with a higher share total, thereby equalizing the share totals of the respective task queues 3.

(Second Embodiment)

Figure 6:
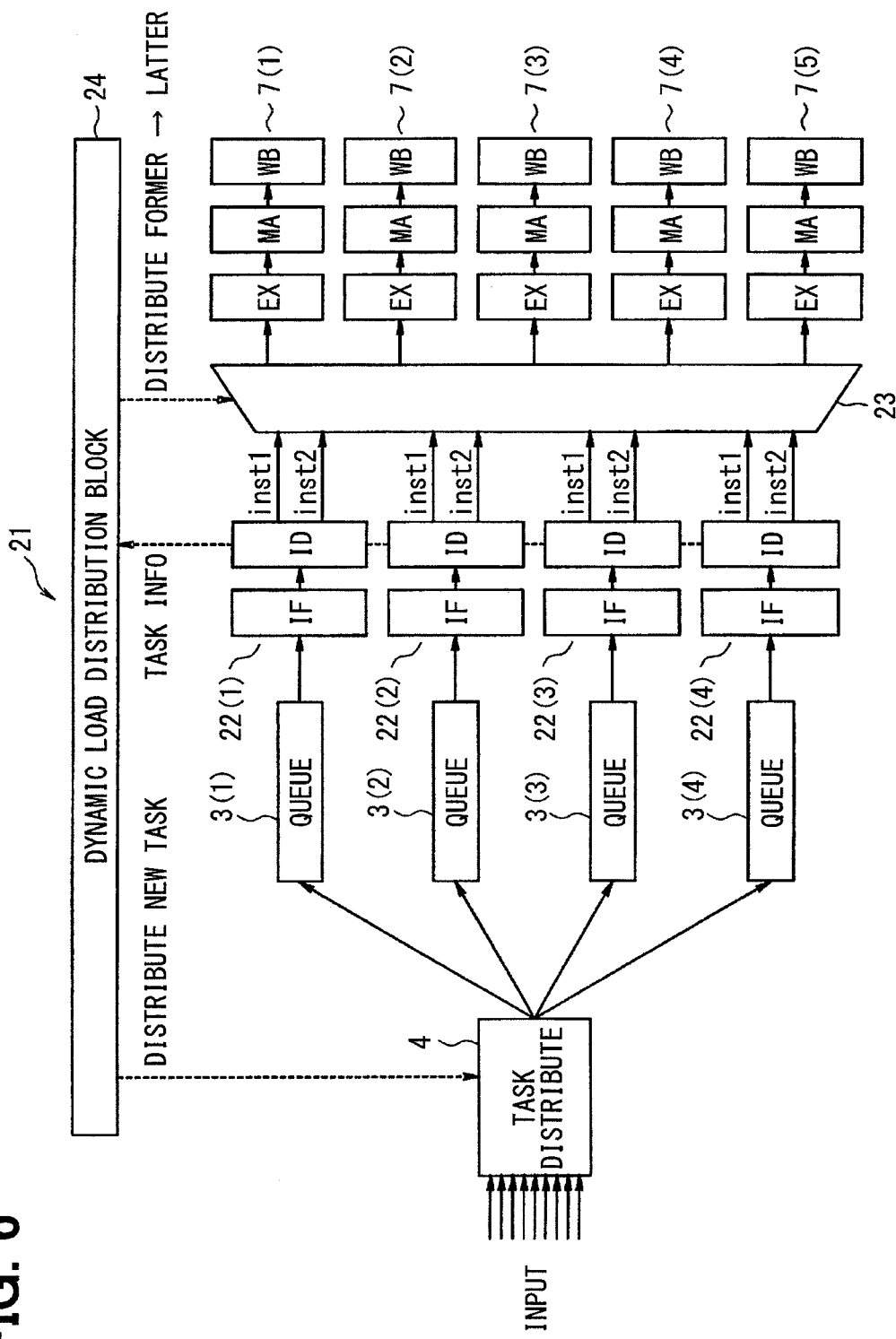
FIG. 6 is a functional block diagram illustrating a configuration of a multi-core processor according to a second embodiment of the present disclosure.

Portions identical to those in the first embodiment are assigned with the reference signs identical to those in the first embodiment and omitted from the explanation; the different portions are only explained on a priority basis. As illustrated in FIG. 6, a multi-core processor 21 according to a second embodiment provides a configuration example where the number (e.g., four (4)) of former-stage cores 22 is less than the number (e.g., five (5)) of latter-stage cores 7. It is noted that FIG. 6 omits illustration of a register file 8 and a memory 9.

The former-stage cores 22 according to the second embodiment can perform instructions of fetch and instructions of decode of the tasks in the corresponding task queues in two parallel processing. Therefore, "inst1" and "inst2", which are inputted from the ID stages into the latter-stage processing distribution portion 23, indicate two instructions that were fetched and decoded in parallel.

Figure 7:
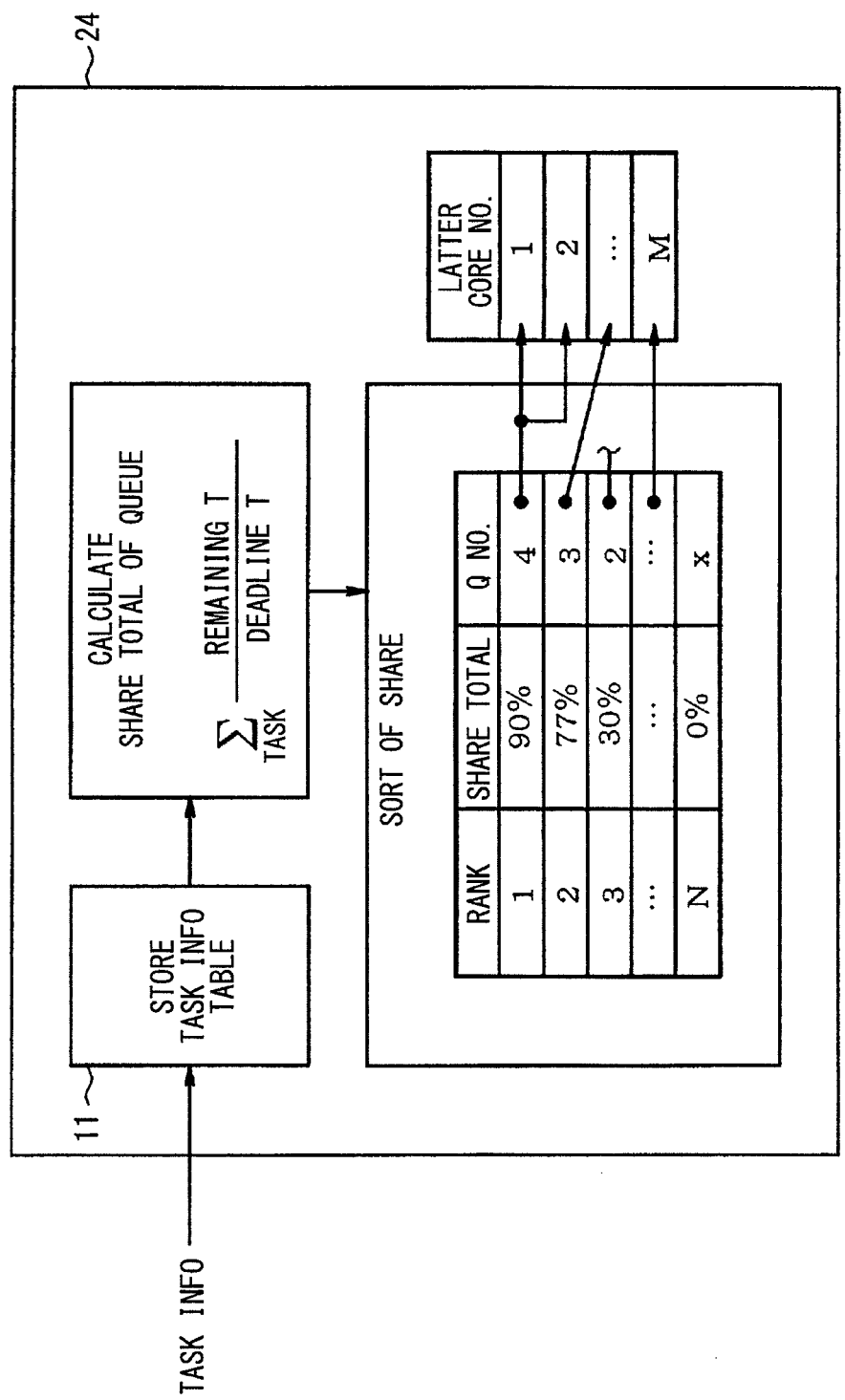
FIG. 7 is a functional block diagram of a dynamic load distribution black according to the second embodiment.

The following describes an operation of the second embodiment. As illustrated in FIG. 7, the dynamic load distribution block 24 distributes the queue number 4 to two latter-stage cores 7. Herein, the queue number 4 corresponds to a task queue 3 providing the share total greater than a threshold value of 80%. Such a configuration facilitates the processing of the task queue 3 with a high share total to reduce the shares, thereby equalizing the share totals of the respective task queues 3 and improving the processing efficiency.

The present disclosure is not limited to the embodiments described above and illustrated in the drawings, and can be modified or expanded as follows. The number of former-stage cores or the number of latter-stage cores may be changed depending on individual designs. In the second embodiment, the threshold value of 80% may be change suitably. Further, the second embodiment may provide another configuration example where the former-stage core performs fetching and decoding in three parallel and at least three latter-stage cores perform parallel processing of one task queue.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A multi-core processor comprising: a plurality of processor cores performing parallel processing of a plurality of tasks using a pipeline containing a plurality of stages, the pipeline being divided into a plurality of former-stage pipeline portion ending, respectively, with an a plurality of instruction decode stages, and one or more latter-stage pipeline portion starting, respectively, with an one or more instruction execution stage; a load distribution processing portion referring to decoded instructions in the instruction decode stages in the former-stage pipeline portions, and controlling, based on the decoded instructions, to assign at least one of the one or more latter-stage pipeline portions with a latter-stage-needed decoded instruction among the decoded instructions, the latter-stage-needed decoded instruction being a decoded instruction whose processing needs to use at least one of the one or more latter-stage pipeline portion portions; a plurality of queues provided to have one-to-one correspondence to the plurality of former-stage pipeline portions, each of the plurality of queues permitting each of the plurality of former-stage pipeline portions to execute tasks one by one; and a task information storage storing a task information table that holds (i) processing time information about a plurality of tasks and (ii) dynamic execution states about the plurality of tasks, wherein the load distribution processing portion refers to the task information table to perform distribution processing of a new task among the plurality of queues, wherein the one or more latter-stage pipeline portions includes a plurality of latter-stage pipeline portions, the load distribution processing portion is configured to control, based on the decoded instructions, to assign one of the plurality of latter-stage pipeline portions with one or more latter-stage-needed decoded instructions among the decoded instructions, the latter-stage-needed decoded instructions being decoded instructions whose processing needs to use the one or more latter-stage pipeline portions, the multicore processor further includes a latter-stage process distribution portion arranged in between (i) the plurality of former-stage pipeline portions following the plurality of queues having one-to-one correspondence to the plurality of former-stage pipelines portions and (ii) the plurality of latter-stage pipeline portions, the latter-stage process distribution portion being caused, based on the decoded instructions in the plurality of instruction decode stages in the plurality of former-stage pipeline portions, by the load distribution processing portion that refers to the task information table to assign one of the plurality of latter-stage pipeline portions with the one or more latter-stage-needed decoded instructions among the decoded instructions, to distribute the latter-stage-needed decoded instruction into the one of the plurality of latter-stage pipeline portions, and a first number of the plurality of former-stage pipeline portions that are configured to be followed by the latter-stage process distribution portion is different from a second number of the plurality of latter-stage pipeline portions, wherein the processing time information held by the task information table includes a remaining execution time and a processing limit time with respect to each of the plurality of task; and the load distribution processing portion calculates, with respect to each of the plurality of queues, a share of each of the plurality of tasks presently in a waiting state using a ratio of the remaining execution time to the processing limit time, and obtains a share total that totals the shares of the plurality of tasks; and the load distribution processing portion finds a minimum-shared queue that is the queue providing the share total that is minimum among the share totals of the plurality of queues, and assigns the found minimum-shared queue with a next new task, wherein the load distribution processing portion finds a high-shared queue that is the queue providing the share total that is high among the share totals of the plurality of queues, finds a low-shared queue that is the queue providing the share total that is low among the share totals of the plurality of queues, gives a high priority to a high-shared former-stage pipeline portion that is one former-stage pipeline portion among the plurality of former-stage pipeline portions corresponding to the high-shared queue in assigning first and second latter-stage pipeline portions among the plurality of latter-stage pipeline portions with first and second latter-stage-needed decoded instructions chosen from the one or more latter-stage-needed decoded instructions in the high-shared former-stage pipeline portion, gives a low priority to a low-shared former-stage pipeline portion that is one former-stage pipeline portion among the plurality of former-stage pipeline portions corresponding to the low-shared queue in assigning a third latter-stage pipeline portion, different from the first and second latter-stage pipeline portions, among the plurality of latter-stage pipeline portions with a third latter-stage-needed decoded instruction chosen from the one or more latter-stage-needed decoded instructions in the low-shared former-stage pipeline portion.

2. The multi-core processor according to claim 1, wherein the one or more latter-stage pipeline portions includes a plurality of latter-stage pipeline portions, and when a plurality of instructions decoded in the plurality of former-stage pipeline portions are ready to undergo parallel execution, the load distribution processing portion assigns the plurality of instructions to the plurality of latter-stage pipelines portions and permits the plurality of latter-stage pipelines to perform the parallel execution of the plurality of instructions.

3. The multi-core processor according to claim 1, wherein the processing time information held by the task information table includes a remaining execution time and a processing limit time with respect to each of the plurality of tasks; and the load distribution processing portion calculates, with respect to each of the plurality of queues, a share of each of the plurality of tasks presently in waiting state using a ratio of the remaining execution time to the processing limit time, and obtains a share total that totals the shares of the plurality of tasks; and the load distribution processing portion finds a minimum-shared queue that is the queue providing the share total that is minimum among the share totals of the plurality of queues, and assigns the found minimum-shared queue with a next new task.

4. The multi-core processor according to claim 3, wherein the load distribution processing portion finds a high-shared queue that is the queue providing the share total that is high among the share totals of the plurality of queues, and gives a priority to a high-shared former-stage pipeline portion that is one of the former-stage pipeline portions corresponding to the high-shared queue in assigning the one or more latter-stage pipeline portions with the latter-stage-needed decoded instruction in the high-shared former-stage pipeline portion.

5. The multi-core processor according to claim 3, wherein the one or more latter-stage pipeline portions includes a plurality of latter-stage pipeline portions, and the load distribution processing portion finds a high-shared queue that is the queue providing the share total that is high among the share totals of the plurality of queues, gives a priority to a high-shared former-stage pipeline portion that is one of the former-stage pipeline portions corresponding to the high-shared queue, and assigns at least two of the latter-stage pipeline portions with the latter-stage-needed decoded instruction in the high-shared former-stage pipeline portion.

6. The multi-core processor according to claim 1, wherein the task information table stored by the task information storage holds (i) the processing time information including a remaining execution time and a processing limit time about each of the plurality of tasks, and (ii) the dynamic execution states about the plurality of tasks, and wherein the processing time information is not dynamically varied during of each of the plurality of tasks whereas the dynamic execution states are dynamically varied during execution of a task.

7. The multi-core processor according to claim 1, wherein the first number of the plurality of former-stage pipeline portions is greater than the second number of the plurality of latter-stage pipeline portions.

8. The multi-core processor according to claim 1, wherein the first number of the plurality of former-stage pipeline portions is smaller than the second number of the plurality of latter-stage pipeline portions.

9. The multi-core processor according to claim 1, wherein:
each of the plurality of former-stage pipeline portions includes an instruction fetch state and the instruction decode stage; and
each of the plurality of latter-stage pipeline portions includes the instruction execution stage, a memory access stage, and a write stage.

10. The multi-core processor according to claim 1, wherein
the load distribution processing portion
finds a high-shared queue that is the queue providing the share total that is high among the share totals of the plurality of queues, and
gives a priority to a high-shared former-stage pipeline portion that is one of the former-stage pipeline portions corresponding to the high-shared queue in assigning one of the latter-stage pipeline portions with the latter-stage-needed recorded instruction in the high-shared former-stage pipeline portion.

11. The multi-core processor according to claim 1 wherein when a plurality of instructions decoded in the plurality of former-stage pipeline portions are ready to undergo parallel execution, the load distribution processing portion
assigns the plurality of instructions to the plurality of latter-stage pipeline portions and
permits the plurality of latter-stage pipeline portions to perform the parallel execution of the plurality of instructions.

12. The multi-core processor according to claim 1, the multi-core processor further comprising:
a latter-stage process distribution portion arranged in between (i) the plurality of former-stage pipeline portions following the plurality of queues having one-to-one correspondence to the plurality of former-stage pipeline portions and (ii) the one or more latter-stage pipeline portions,
the latter-stage process distribution portion
being caused, based on the decoded instructions in the plurality of instruction decode stages in the plurality of former-stage pipeline portions, by the load distribution processing portion that refers to the task information table and assigns one of the one or more latter-stage pipeline portions with the latter-stage needed decoded instruction among the decoded instructions,
to distribute the latter-stage-needed decoded instruction into the one of the one or more latter-stage pipeline portions,
wherein a first number of the plurality of former-stage pipeline portions that are configured to be followed by the latter-stage process distribution portion is greater than a second number of the one or more latter-stage pipeline portions that is configured to follow the latter-stage process distribution portion.

13. The multi-core processor according to claim 12, wherein:
each of the plurality of former-stage pipeline portions includes an instruction fetch stage and the instruction decode stage; and each of the one or more latter-stage pipeline portions includes the instruction execution stage, a memory access stage, and a write stage.

14. The multi-core processor according to claim 12, wherein
the processing time information held by the task information table includes a remaining execution time and a processing limit time with respect to each of the plurality of task; and
the load distribution processing portion
calculates, with respect to each of the plurality of queues, a share of each of the plurality of tasks presently in a waiting state using a ratio of the remaining execution time to the processing limit time, and
obtains a share total that totals the shares of the plurality of tasks; and
the load distribution processing portion
finds a minimum-share queue that is the queue providing the share total that is minimum among the share totals of the plurality of queues, and
assigns the found minimum-shared queue with a next new task.

15. The multi-core processor according to claim 14, wherein
the load distribution processing portion
finds a high-shared queue that is the queue providing the share total that is high among the share totals of the plurality of queues, and
gives a priority to a high-shared former-stage pipeline portion that is one former-stage pipeline portion among the plurality of former-stage pipeline portions corresponding to the high-shared queue in assigning the at one or more latter-stage pipeline portions with the latter-stage-needed recorded instruction in the high-shared former-stage pipeline portion.

16. The multi-core processor according to claim 12, wherein the task information table stored by the task information storage holds
(i) the processing time information including a remaining execution time and a processing limit time about each of the plurality of tasks, and
(ii) the dynamic execution states about the plurality of tasks, and
wherein the processing time information is not dynamically varied during of each of the plurality of tasks whereas the dynamic execution states are dynamically varied during execution of a task.

17. The multi-core processor according to claim 1, wherein
the latter-stage process distribution portion is caused to distribute one or more of the latter-stage-needed decoded instructions to the one of the plurality of latter stage pipeline portions based on a task dynamic execution state, a task deadline time, a task worst time, a task remaining time, and a task queue number for each of the decoded instructions.

18. The multi-core processor according to claim 1, wherein
the load distribution processing portion
finds a high-shared queue that is the queue providing the share total that is high among the share totals of the plurality of queues,
gives a priority to a high-shared former-stage pipeline portion that is a one of the former-stage pipeline portions corresponding to the high-shared queue, and
assigns at least two of the latter-stage pipeline portions with the latter-stage-needed decoded instruction in the high-shared former-stage pipeline portion.

\* \* \* \* \*